United States Patent [19]
Allen

[11] Patent Number: 5,965,153
[45] Date of Patent: Oct. 12, 1999

[54] DIETARY SUPPLEMENT FOR PREVENTING OR REDUCING SHEDDING BY ANIMALS

[75] Inventor: Barbara A. Allen, Farmington, Conn.

[73] Assignee: Stabar Enterprises, Inc., Farmington, Conn.

[21] Appl. No.: 09/047,092

[22] Filed: Mar. 24, 1998

[51] Int. Cl.⁶ .............................. A23K 1/165; A23K 1/17
[52] U.S. Cl. ............................................ 424/442; 424/401
[58] Field of Search ...................................... 424/442, 489, 424/78.02, 78.06, 401, 72

[56] References Cited

U.S. PATENT DOCUMENTS 4,862,748  9/1989  Herschler ................................... 426/72
5,700,457  12/1997  Dixon .................................... 424/78.02

Primary Examiner—Thurman K. Page
Assistant Examiner—William E. Benston, Jr.
Attorney, Agent, or Firm—Cooper & Dunham LLP

[57] ABSTRACT

A dietary supplement for animals, comprising safflower oil, sunflower oil, olive oil, soya oil, cod liver oil, lecithin, natural flavors, herbs, garlic, and zinc. When fed to a dog or cat daily in a proper dosage, the supplement reduces or eliminates non-seasonal shedding and promotes healthy skin and a glossy, silky coat, without affecting the dog's or cat's natural shedding cycle and without causing any harmful effects. The composition also may be administered topically.

11 Claims, No Drawings

DIETARY SUPPLEMENT FOR PREVENTING OR REDUCING SHEDDING BY ANIMALS

BACKGROUND OF THE INVENTION

The present invention relates generally to compositions for keeping animals' skins and coats healthy. More specifically, the present invention relates to a dietary supplement for dogs and cats that prevents shedding out of season and promotes healthy skin and silky, glossy coats.

There are over 54 million domesticated dogs and over 63 million domesticated cats in the United States. The owners of these pets and other animals have had to cope with the problems associated with keeping the animals indoors and coming into frequent contact with the animals. Additionally, these pet owners deeply care for their pets and want to keep them as healthy and as beautiful as possible.

One of the problems pet owners often encounter is excessive amounts of pet hair clinging to clothes and fabrics and covering surfaces, including floors, carpets, and furniture. This is a result of shedding, the process by which many animals routinely lose their hair. New hair grows to replace that which is lost, so that the animals maintain a full coat.

Shedding is a normal process for certain animals and breeds, and should take place in those animals every spring. However, many individual animals shed throughout the year, not just during their natural shedding cycle. It is this unwanted, non-seasonal shedding that creates the year-round covering of pet hair found in the homes and on the clothes of pet owners.

Pet owners also are interested in keeping their pets healthy, and one aspect of that is healthy skin. Animals may be subject to myriad problems and diseases of the skin, including fungus infections and seasonal dry skin. Additionally, most pet owners want their pets to have a coat that is pleasing to the eye and to the touch. This is especially true for owners of show dogs, but is equally important to owners of household pets. It is desirable that pets have coats that look and feel healthy, glossy, and silky.

In view of the above mentioned problems and considerations, the present invention contemplates a liquid composition that supplements a dog's or cat's food daily, prevents or reduces non-seasonal shedding and promotes healthy skin and a silky, glossy coat. Prior products on the market have partially met this need but have not fully achieved the objective. As described below, the present composition solves the problems and is safe and all-natural, does not interfere with an animal's natural shedding cycle, and is highly palatable to dogs and cats.

OBJECTS AND SUMMARY OF THE INVENTION

In view of the aforementioned considerations, it is an object of the present invention to provide a liquid composition that reduces or eliminates non-seasonal shedding in dogs and cats.

It is another object of the present invention to provide a composition that, when ingested as a dietary supplement, fosters healthier skin in dogs and cats, including reduction of fungus infections and seasonal dry skin.

It is another object of the present invention to provide a liquid composition that fosters healthy, glossy, silky coats in dogs and cats.

It is yet another object of the present invention to provide a supplement for dogs and cats that reduces or eliminates non-seasonal shedding but does not interfere with their natural shedding cycles.

It is another object of the present invention to provide a supplement for dogs and cats that is comprised entirely of natural products and is not harmful when ingested.

It is still another object of the present invention to provide a liquid dietary supplement that is highly palatable to dogs and cats when mixed with their normal daily food supply.

The present invention contemplates a liquid composition comprising safflower oil, sunflower oil, olive oil, soya oil, cod liver oil, lecithin, natural flavors, herbs, garlic and zinc, (and additional fish oils for cats). At least 3% of the composition is crude protein, at least 86% is crude fat, no more than 1% is crude fiber, and no more than 1% is moisture. When the proper dosage is mixed into a dog's or cat's food, once daily, as a dietary supplement, it has the effects of reducing or eliminating non-seasonal shedding by the animal and fostering healthy skin and a glossy, silky coat on the animal. The supplement does not affect the animal's natural shedding cycle, and the animal does not experience any harmful effects.

DETAILED DESCRIPTION OF THE INVENTION

In one preferred embodiment of the present invention, a liquid composition is comprised of the following: safflower oil, sunflower oil, olive oil, soya oil, cod liver oil, lecithin, natural flavors, herbs, garlic, and zinc. The relative percentages of these substances in the composition are in the order listed. The resulting composition contains at least 3% crude protein, at least 86% crude fat, no more than 1% crude fiber, and no more than 1% moisture.

The olive, soya, cod liver oils are an important source of vitamins A, B complex and E, and of linolenic and linoleic acids. Additional vitamins and anti-oxidants may be added to the composition where desirable.

Although the exact mechanism of operation of the composition is not known to the applicant, there appears to be a synergistic relationship between the oils and fatty acids which results in the significant achievements of the invention.

The composition preferably is mixed into an animal's food once daily as a dietary supplement. The dosage for a dog depends on the dog's size. Generally, a dog weighing up to 20 pounds should be given one tablespoon daily, a dog weighing between 20 and 45 pounds should be given two tablespoons daily, a dog weighing between 45 and 75 pounds should be given three tablespoons daily, and a dog weighing over 75 pounds should be given four tablespoons daily. The supplement has a taste that dogs enjoy, or, at the very least, do not resist, and is therefore easy to administer.

If the supplement is properly taken, reduction or elimination of non-seasonal shedding by the dog occurs. Seasonal shedding is the loss of hair during an animal's naturally occurring shedding cycle. For many dogs, this occurs every spring. The present composition is designed to reduce or eliminate shedding during the rest of the year, at all times outside the dog's natural shedding cycle. The supplement will not affect the dog's natural shedding cycle, and there are no known harmful effects of taking the supplement.

When properly taken, the supplement fosters healthy skin which includes the reduction or elimination of occurrences of fungus infections and seasonal dry skin. Further, the supplement creates a healthy looking and feeling coat. The dog's coat should be more glossy and silky as a result of taking a daily dose of the supplement.

In another preferred embodiment of the present invention, fish oils are added to the composition set forth above. This alternative formulation is specifically useful as a dietary supplement for cats. The positive results set forth above occur in a cat that ingests a proper dosage of the supplement daily, and there are no harmful effects as a result of taking the supplement.

Although the compositions of the invention preferably are administered orally, the compositions may also be topically administered by rubbing into the coat and skin of the animal.

The embodiments described above are illustrative examples of the present invention and the present invention is not limited to these particular embodiments. Various changes and modifications may be made by one skilled in the art without departing from the scope or spirit of the invention as disclosed and claimed herein.

I claim:

1. A composition for reducing or eliminating non-seasonal shedding by an animal and for fostering healthy skin and a glossy, silky coat on the animal, comprising in combination an acceptable dosage of safflower oil; sunflower oil; olive oil; soya oil; cod liver oil; lecithin; natural flavors; herbs; garlic; and zinc.

2. The composition according to claim 1, wherein not less than 3% of the composition is crude protein, not less than 86% of the composition is crude fat, not more than 1% of the composition is crude fiber, and not more than 1% of the composition is moisture.

3. The composition according to claim 1, further comprising fish oils.

4. The composition according to claim 1, wherein the composition is administerable as a dietary supplement.

5. The dietary supplement according to claim 1, wherein the composition is administerable topically.

6. A method for reducing or eliminating non-seasonal shedding by an animal and fostering healthy skin and a glossy, silky coat on the animal, comprising:

feeding the animal, on a daily basis, a dietary supplement comprising safflower oil, sunflower oil, olive oil, soya oil, cod liver oil, lecithin, natural flavors, herbs, garlic, and zinc.

7. The method according to claim 6, wherein the dietary supplement is not less than 3% crude protein, not less than 86% crude fat, not more than 1% crude fiber, and not more than 1% moisture.

8. The method according to claim 6, wherein the dietary supplement additionally comprises fish oils.

9. The method according to claim 6, wherein the daily dose of the dietary supplement fed to the animal ranges from about 0.25 to 6 tablespoons.

10. The method according to claim 6, wherein the animal is a dog.

11. The method according to claim 6, wherein the animal is a cat.

* * * * *